United States Patent [19]

Loveless

[11] 3,712,577
[45] Jan. 23, 1973

[54] RESET OPERATOR FOR PRESSURE FLUID VALVE

[75] Inventor: Stanley M. Loveless, Oshtemo, Mich.

[73] Assignee: General Gas Light Company, Kalamazoo, Mich.

[22] Filed: Feb. 24, 1970

[21] Appl. No.: 13,307

[52] U.S. Cl. ..........................251/23, 91/219, 91/416
[51] Int. Cl. .......................F16k 31/143, F15k 15/17
[58] Field of Search .......251/15, 23, 48; 91/416, 219

[56] References Cited

UNITED STATES PATENTS

| | | | |
|---|---|---|---|
| 3,197,172 | 7/1965 | Brandenberg et al. | 251/33 |
| 513,601 | 1/1894 | Teal | 91/416 X |
| 3,160,486 | 12/1964 | Busch, Jr. | 91/219 X |

Primary Examiner—Arnold Rosenthal
Attorney—Woodhams, Blanchard & Flynn

[57] ABSTRACT

An automatically resettable, fluid-actuated, operating device for controlling an external device, such as a spool valve assembly. The operating device includes a housing having a chamber in which is slideably positioned a piston. A spring is positioned in the chamber for normally urging the piston toward one end of the chamber. Pressurized fluid supplied to said one end of the chamber causes the piston to move away from said one end position for causing actuation of the external device. The piston contains a small bleed passageway therethrough for permitting controlled flow of fluid to the other side of the piston whereby, after a predetermined time, the fluid and the spring adjacent the other side of the piston return the piston to its original end position. The piston is provided with a resilient seal ring which substantially functions as a one-way check valve for permitting the fluid adjacent said other side of the piston to be rapidly vented.

10 Claims, 4 Drawing Figures

PATENTED JAN 23 1973

3,712,577

INVENTOR
STANLEY M. LOVELESS
BY
Woodhams, Blanchard & Flynn
ATTORNEYS

RESET OPERATOR FOR PRESSURE FLUID VALVE

FIELD OF THE INVENTION

This invention relates to an operating device for converting a fluid pressure signal into a momentary mechanical actuating force. Particularly, the device comprises a fluid-actuated operator having a movable actuator for shifting a valve with the pressure signal causing the actuator to automatically return to its original position after lapse of a predetermined time for permitting overriding control of the valve independently of the fluid pressure signal.

BACKGROUND OF THE INVENTION

In spite of the use over many years of fluid pressure control circuits, particularly pneumatic control circuits, there has been a long-standing need and demand for control circuits components capable of responding to a pilot fluid for coacting with and actuating a further component, such as a control valve or an electrical switch. Particularly, the control circuit component must be capable of fluid actuation while at the same time the component must be of extremely small size and capable of efficient operation. Further, the components must be capable of substantially automatic operation in response to fluid pressure actuation and control.

While numerous control circuit components are known, most of these components have proven undesirable due to their undesirable size and mechanical complexity. These undesirable limitations result in the overall control circuit occupying more space and requiring more maintenance than is tolerable in many cases where such equipment would otherwise be applicable, and also result in the individual components being of excessive cost.

In many known use situations, a load member such as a valve or electrical switch is actuated by means of a fluid-actuated operator which converts a fluid pressure signal into a mechanical actuation of the load member, the movement and/or position of the load member being directly dependent upon and controlled by the movement and/or position of the operator. However, often times it is desirable to cause actuation and/or movement of the load member, particularly return movement thereof, independently of the operator, either due to a desired manufacturing sequence or due to an emergency situation such as a power failure. In the prior known devices, this permissible independent control of the load member was generally possible only by providing additional control components interconnected to the operator for permitting release of the operator, which in turn would then permit return movement of the load member. While these systems do operate in a satisfactory manner, nevertheless they are undesirable since they require the use of a plurality of additional control components for permitting the overriding function to be performed, thereby making the overall system more complex and costly.

Accordingly, it is an object of the present invention to provide an improved operating device which is capable of converting a fluid pressure signal into a single momentary mechanical actuation for actuating an external load member, such as a valve or an electrical switch, with the operator being incapable of further actuation so long as the fluid pressure signal is sustained.

A further object of the present invention is to provide an operator, as aforesaid, having an actuator member which rapidly and automatically returns to its original position for permitting external overriding control and/or movement of the external load member independently of the pilot pressure signal.

A still further object of the present invention is to provide an operator, as aforesaid, wherein the pressure signal causes the actuator member to automatically return to its original position after lapse of a predetermined time of short duration.

Still a further object of the present invention is to provide an operator, as aforesaid, which is quickly and automatically reset to its original condition upon termination of the fluid pressure signal or upon a substantial decrease in the pressure level of the signal whereby the operator can be promptly subjected to a further pressure signal for causing a further mechanical actuation.

Another object of the present invention is to provide a fluid-actuated operator, as aforesaid, which converts a fluid pressure signal, which signal may be of a sustained duration of from a fraction of a second to several hours, into a single momentary mechanical actuation with the momentary mechanical actuation in turn be utilized for actuating an external load member for providing a momentary electrical or fluid pressure signal.

A further object of the present invention is to provide a fluid-actuated operator, as aforesaid, particularly an operator adapted to be pneumatically operated, and designed for attachment to and operation of a valve assembly, particularly a spool valve assembly.

Still a further object of the present invention is to provide an improved fluid-actuated operator which is small, compact, relatively inexpensive to manufacture, efficient in operation, relatively free of maintenance, and adaptable to be connected or mounted on a plurality of different external devices or valves for actuation thereof.

Other objects and purposes of the invention will be apparent to persons acquainted with devices of this type upon reading the following specification and inspecting the accompanying drawings.

Figure 1:
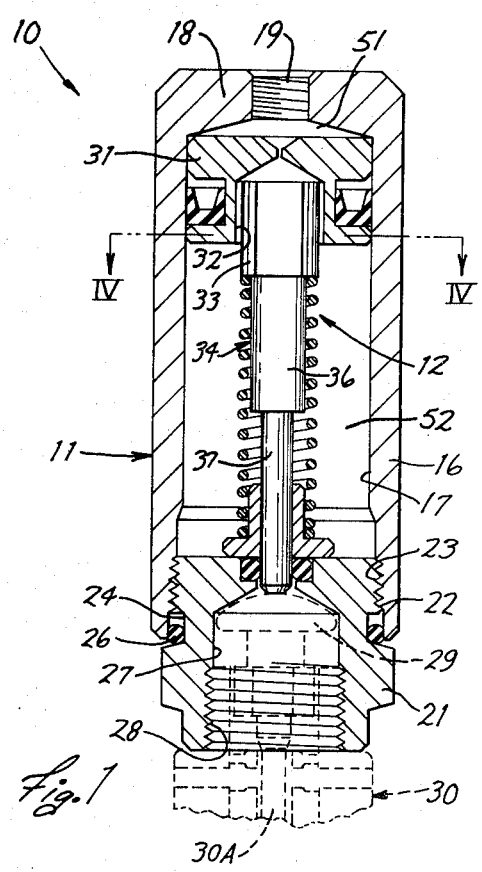
FIG. 1 is a cross-sectional view of an operator constructed according to the present invention, the operator being illustrated in its normal or set position.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Such terminology will include the words above specifically mentioned, derivatives thereof and words of similar import.

SUMMARY OF THE INVENTION

The objects and purposes of the present invention are met by providing an operator having a substantially closed housing containing an actuator mechanism slideably received therein. The actuator mechanism divides the interior of the housing into first and second chambers, which chambers communicate with one another by means of a small bleed opening. A pressurized pilot fluid or signal is supplied to the first chamber for causing movement of the actuator mechanism in opposition to the urging of a spring, which movement causes the actuator mechanism to contact and actuate an external device, such as a shiftable valve spool or an electrical switch. The pressurized fluid within the first chamber passes through the bleed opening into the second chamber whereby, after a determined time interval, the pressurized fluid within the second chamber in combination with the urging of the spring causes the actuator mechanism to return to its original position. This thus permits the external device, if necessary or desired, to be independently externally actuated or controlled, thereby permitting an overriding of the pilot pressure supplied to the operator. The actuator mechanism includes a resilient seal ring disposed in sealing engagement with the housing, which seal ring acts as a one-way check valve for permitting the pressurized fluid within the second chamber to rapidly escape therefrom when the pilot pressure is terminated or substantially decreased. This thus causes the operator to be reset to its original condition.

DETAILED DESCRIPTION

Figure 2:
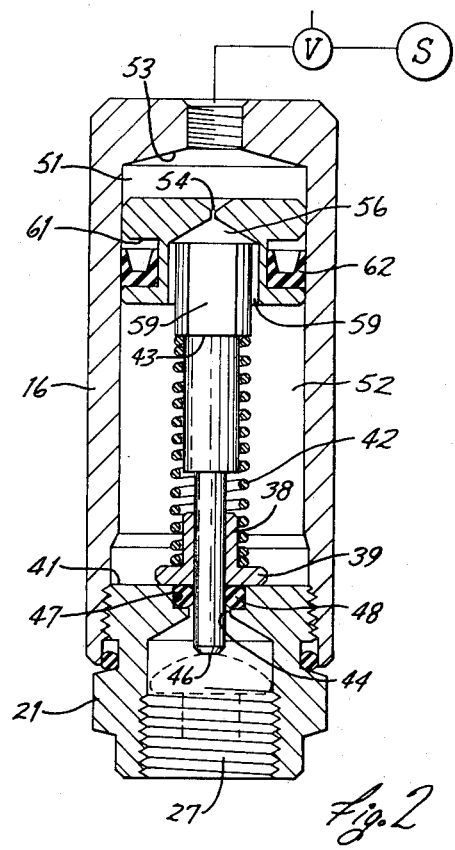
FIG. 2 is a cross-sectional view similar to FIG. 1 and illustrating the operator in its actuated position.

FIGS. 1 and 2 illustrate therein a fluid-actuated, automatically resettable operator 10 constructed according to the present invention. The operator 10 includes a housing 11 in which is positioned a slideable actuator mechanism 12.

The housing 11 specifically includes a cylindrical sleeve 16 which defines therein a cylindrical bore 17. The one end of the bore 17 is substantially closed by means of an end wall 18 which is fixedly, here integrally, connected to the sleeve 16. The end wall 18 is provided with a pilot port or opening 19 extending therethrough, which pilot port is adapted to receive therein a suitable conduit for supplying a pressurized pilot fluid or signal to the operator 10.

The other end of the sleeve 16 is substantially closed by means of a suitable cap or adaptor 21. The cap 21 has external threads 22 thereon which are disposed in engagement with further internal threads 23 provided adjacent the end of the sleeve 16. The cap has a suitable groove or recess 24 in which is positioned a resilient O-ring 26, which O-ring also engages the internal wall of the sleeve 16 for creating a sealed relationship therewith. The outer end of the cap 21 is provided with an enlarged bore 27, the outer end portion 28 of which is threaded for permitting the operator 10 to be suitably threadably connected to an external device 30, such as one of the spool valve assemblies disclosed in my copending application Ser. No. 13,325 filed Feb. 24, 1970, now U.S. Pat. No. 3,661,182, which valve assembly 30 has a plunger or actuator button 29 adapted to be disposed within the bore 27 for actuation thereof by the actuator mechanism 12.

The actuator mechanism 12 specifically includes a piston 31 slideably received within the bore 17, the piston having an enlarged central bore 32 in which is snugly, here fixedly, received the enlarged head portion 33 of the actuator rod 34. The actuator rod 34 has an intermediate cylindrical portion 36 which is of smaller diameter than the head portion 33 and is fixedly, here integrally, connected thereto. The cylindrical portion 36 is also fixedly, here integrally, connected to a reduced diameter end portion 37. The end portion 37 is slideabley received within and extends through a guide sleeve 38, which sleeve has a rear flange portion 39 which abuts against the inner axial end face 41 of the cap 21.

The actuator mechanism 12 is provided with a compression spring 42 positioned in surrounding relationship to the rod 34. One end of the compression spring 42 bears against a shoulder 43 formed at the interface of the rod portions 33 and 36 and the other end of the compression spring bears against the flange portion 39. The spring 42 thus normally urges the actuator mechanism 12 into a set position wherein the piston 31 is disposed adjacent the end wall 18 as illustrated in FIG. 1.

The free end of the actuator rod 34, particularly the lower end of the rod portion 37 as illustrated in FIGS. 1 and 2, is adapted to extend into and through a central opening 44 provided in the end cap 21, which opening 44 communicates with and is substantially coaxially aligned with the bore 17. The end face 46 of the rod 34 is thus disposed for coaction with the actuator button 29. The end cap 21 is also provided with a small annular recess 47 disposed in surrounding relationship to the opening 44, which recess 47 receives therein a resilient seal ring 48, such as an O-ring, for surrounding and sealingly engaging the outer periphery of the rod portion 37.

As illustrated in FIGS. 1 and 2 the piston 31 divides the interior of the housing 11 into two chambers 51 and 52. The chamber 51 is in part defined by the interior conical end surface 53 formed on the end wall 18 for permitting pressurized fluid supplied through the port 19 to act against the end face of the piston 31.

To provide for flow of fluid from the chamber 51 to the chamber 52, the piston 31 is provided with a flow passageway therethrough, which passageway includes a small orifice or bleed opening 54, which orifice 54 in turn communicates with an enlarged intermediate chamber 56 defined between the conical piston wall 57 (FIG. 3) and the upper end face 58 of the rod 34. The chamber 56 thus substantially constitutes an extension of the bore 32 formed within the piston 31. The head portion 33 of the actuator rod 34 is further provided with one or more flats extending axially of the periphery thereof, which flats thus result in the formation of passages 59 which provide communication between the intermediate chamber 56 and the chamber 52. The orifice 54, intermediate chamber 56 and passages 59 thus provide a continuous passageway between the chambers 51 and 52. However, the orifice 54 is of the smallest cross-sectional area and thus acts as a restriction for impeding the free flow of fluid from chamber 51 to chamber 52.

The piston 31 is also provided with an annular groove 61 in the external periphery thereof, which groove receives therein a resilient elastomeric seal ring 62 for creating a sealed relationship between the piston 31 and the surrounding internal housing wall 17. The resilient seal ring 62 is preferably provided with an annular slot or recess 63 in the side thereof facing the chamber 51 so as to result in the seal ring 62 having a substantially U or V shaped cross-sectional configuration. The seal ring 62 thus has a pair of resilient leg portions 66 and 67 with the resilient leg portion 67 being adapted for sealing engagement with the surrounding internal housing wall 17.

Figure 3:
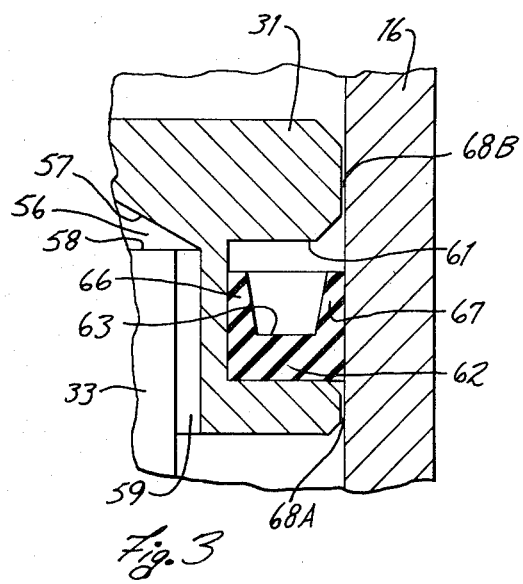
FIG. 3 is an enlarged fragmentary view of a portion of the operator illustrated in FIG. 2.
Figure 4:
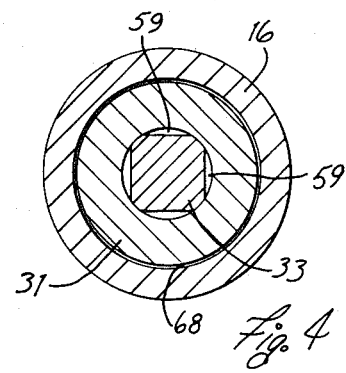
FIG. 4 is a cross-sectional view as taken along the line IV—IV of FIG. 1.

The piston 31 is, as illustrated in FIG. 3, preferably of a diameter substantially less than the internal diameter of the bore 17 so as to result in a substantially annular clearance space or passageway therebetween, which clearance space includes portions 68A and 68B (FIG. 3) located on opposite sides of the seal ring 62. Particularly, the radial clearance between the piston 31 and the internal housing wall 17 exceeds that necessary to provide a sliding fit and is preferably approximately 0.005 inches, and is generally within the range of between approximately 0.002 and 0.020 inches. The purpose for this radial clearance space 68A-68B will be described hereinbelow.

OPERATION

The operation of the device embodying the invention will be described in detail hereinbelow for a better understanding thereof.

Assuming that the operator 10 is connected to an external device 30, such as the spool valve assembly illustrated in FIG. 9 of my copending application Ser. No. 13,325 now U.S. Pat. No. 3,661,182, then actuation of the operator 10 will cause a corresponding actuation of the valve spool 30A due to the operator 10 causing a shifting of the actuator button 29.

The operator 10 will normally be maintained in its set position as illustrated in FIG. 1, in which position the piston 31 is maintained in one end position. When pilot pressure fluid, preferably pressurized air, is supplied from source S to the chamber 51 through the pilot port 19, the pressurized air acts on the piston 31 and causes the piston 31 and the actuator rod 34 to be axially moved away from the end wall 18, which movement causes the end face 46 of the actuator rod 34 to contact and move the actuator button 29. The actuator mechanism 12 thus moves into an operated position substantially as illustrated in FIG. 2, the exact amount of movement of the actuator mechanism being controlled by the shoulder between rod portions 36 and 37 striking sleeve 38 and/or the amount of permissible movement of the actuator button 29. This movement of the rod 34 from the set position of FIG. 1 to the operated position of FIG. 2 thus causes a corresponding shifting of the valve spool 30A connected to the button 29.

When the actuator mechanism 12 is moved to the operated position illustrated in FIG. 2, the pressurized pilot fluid supplied to the upper chamber 51 initially remains therein and for the moment prevents the spring 42 from returning the piston to its set position. The pilot fluid is retained in chamber 51 either by maintaining chamber 51 in communication with the pilot fluid source S or by locking the fluid within the chamber, as by closing an external flow control valve V. However, some of the pressurized fluid within the upper chamber 51 flows through the orifice 54 into the intermediate chamber 56, the orifice 54 causing a restricted flow of the pressurized fluid from chamber 51. The fluid in intermediate chamber 56 then flows through the passages 59 into the lower chamber 52.

After a determined time period has elapsed, which time period is often relatively short such as several milliseconds, the pressure of the fluid within the lower chamber 52 will have risen to a sufficient level such that it will exert a pressure force against the lower face of the piston 31 which, in conjunction with the urging of the spring 42, will be sufficient to overcome the pressure force imposed of the upper side of the piston 31 by the pilot fluid within the chamber 51. When this condition is reached, the fluid within the chamber 52 in conjunction with the spring 42 will cause the piston 31 and the rod 34 to be returned to the set position illustrated in FIG. 1.

When the piston 31 has been returned to its set position in the manner explained above, and assuming that the pressurized pilot fluid is still present within the chamber 51, then the pressurized fluid will also be present within the chamber 52 and thus the operator 10 will not be able to undergo a further cycle of operation. However, inasmuch as the piston 31 and rod 34 have already been retracted, the external device, such as the valve spool 30A, can then be externally and independently actuated and/or controlled so as to permit an overriding of the operator 10. That is, independent and external control of the valve spool 30A is possible even though the pressurized pilot fluid is still present within the chamber 51 of the operator 10. This is of substantial importance in use situations wherein the spool valve 30A is of the detent type and thus does not follow the return movement of the piston.

The pressurized pilot fluid in chamber 51 will normally be vented after the piston 31 has been returned to the set position illustrated in FIG. 1, whereupon the pressure of the fluid within the chamber 52 will exceed the pressure of any remaining fluid within chamber 51. Accordingly, the fluid in chamber 52 will then tend to flow back into chamber 51 and a limited amount of the fluid will flow through passages 59, chamber 56 and orifice 54 in the reverse manner as explained above. However, the small area of the orifice 54 greatly restricts this flow and thus venting of chamber 52 in this manner would take a substantial time and would thus prevent immediate reactuation of the operator 10.

Accordingly, in the present invention, the venting of the lower chamber 52 occurs primarily due to the substantial annular clearance space 68A-68B which exists between the piston 31 and the internal annular wall 17. When the pressure within chamber 52 exceeds the pressure within chamber 51, then the pressurized fluid within chamber 52 and within space 68A acts against the resilient leg portion 67 of the seal ring 62, causing leg portion 67 to be deflected inwardly away from the housing wall 17 so as to permit the pressurized fluid to freely pass through the annular space 68B back into the chamber 51, whereupon the fluid is vented through the port 19. While the resilient seal ring 62 thus permits the flow of pressurized fluid from chamber 52 to chamber 51, it does not permit flow in the opposite direction since any fluid flowing from chamber 51 through clearance space 68B will enter into the annular recess 63 formed in the seal ring 62, whereupon the pressurized fluid will cause the resilient leg portion 67 to be moved outwardly into even tighter sealing engagement with the internal wall 17 of the housing. The seal ring 62 thus substantially functions as a one-way check valve for permitting rapid and efficient venting or escape of fluid from the chamber 52. This thus permits the operator 10 to be rapidly restored or reset to its initial condition so as to be ready to undergo a new cycle of operation.

The operation as described above specifically refers to the use of the operator 10 for actuating a valve assembly wherein the valve spool 30A is not spring biased into engagement with the rod 34 and thus when the valve spool 30A is axially displaced (downwardly in FIG. 1) by the rod 34, the valve spool will remain in its displaced position when the rod 34 and piston 31 are returned to their original positions as illustrated in FIG. 1. This type of operational relationship thus permits the valve spool 30A to be independently returned to its original position (that is, displaced axially upwardly in FIG. 1) even though the pilot pressure fluid has not been relieved from the chambers 51 and 52.

The operator 10 as described above could also be utilized for actuating a spring biased valve of the type disclosed in FIGS. 1-5 of my copending application Ser. No. 13,325. When the operator 10 is utilized to cause actuation of a spring-urged valve spool, the valve spool will only be momentarily actuated since the rapid return of the piston 31 and rod 34 to their original FIG. 1 positions will also result in the valve spool being returned along with the piston due to the urging of the spring. This type of operation thus results in the valve spool being shifted into an open position only momentarily, whereupon the valve spool thus provides for a momentary fluid pressure signal. The operator 10 thus converts a sustained pilot pressure signal into a momentary mechanical actuation, which mechanical actuation thus momentarily actuates the valve spool for providing a momentary fluid pressure signal. In an analogous manner, the operator 10 could also be utilized to actuate a spring biased electrical switch so as to provide a momentary electrical signal.

Although the rod 34 is herein shown as mechanically operating a valve, it will be appreciated that it can also operate any desired kind of load, such as an electrical switch or a directly connected mechanical movement.

Although a particular preferred embodiment of the invention has been disclosed above for illustrative purposes, it will be understood that obvious or equivalent variations or modifications thereof which lie within the scope of the invention are fully contemplated.

The embodiments of the invention in which I claim an exclusive property or privilege are defined as follows:

1. An automatically resettable operator, particularly for a valve, comprising:
   housing means defining a substantially closed bore therein;
   piston means positioned within said bore in slideable sealing engagement with said housing means for movement between first and second positions, said piston means dividing said bore into first and second chambers;
   inlet passage means in communication with said first chamber for supplying pressure fluid to said first chamber for causing movement of said piston means from said first to said second position;
   actuator means in engagement with said piston means and movable therewith for causing actuation of a selected member, such as a valve spool;
   return means for causing said piston means to automatically return to said first position a determined time after said piston means has moved to said second position, said return means including flow passageway means providing communication between said first and second chambers, said flow passageway means including orifice means of small cross-sectional area for restricting the flow of fluid from said first to said second chamber; and
   relief means for permitting rapid escape of pressure fluid from said second chamber, said relief means including return passageway means providing communication between said first and second chambers and one-way check valve means associated with said return passageway means for permitting fluid flow solely in a direction from said second chamber to said first chamber.

2. An operator according to claim 1, wherein said return means includes spring means disposed within one of said chambers for urging said piston means toward said first position.

3. An operator according to claim 1, wherein said piston means is provided with an outer peripheral surface which is spaced from the inner housing wall defining said bore so as to provide an annular clearance space therebetween, said annular clearance space defining said return passageway means, and said one-way check valve means comprising an annular resilient seal ring disposed in surrounding relationship to said piston means, said seal ring having a resiliently deformably leg portion extending in a direction toward said first chamber and maintained in engagement with the inner housing wall when pressurized fluid is supplied to said first chamber, said resilient leg portion being movable away from said inner housing wall when the pressure of the fluid within the second chamber exceeds the pressure of the fluid in the first chamber for permitting flow of fluid therepast.

4. An operator according to claim 3, wherein said resilient seal ring is disposed within an annular groove formed within the periphery of said piston means, said annular seal ring having a substantially channel-shaped cross section.

5. An operator according to claim 1, wherein said actuator means includes an elongated rod positioned within said second chamber, one end of said rod being in engagement with said piston means and the other end of said rod being slideably and sealingly supported by said housing means, said other end of said rod being adapted to extend outwardly of said housing means for engagement with and actuation of said selected member when said piston means is moved from said first to said second position, said selected member being located externally of said closed bore.

6. An operator according to claim 5, further including spring means positioned within said second chamber in surrounding relationship with said rod for normally urging said piston means toward said first position, one end of said spring means being axially stationarily positioned relative to said housing means.

7. An operator according to claim 5, wherein said flow passageway means includes an intermediate chamber formed within said piston means and a further passageway formed in one of said piston means and said actuator means for providing communication between said intermediate chamber and said second chamber, said orifice means providing for communication between said first chamber and said intermediate chamber.

8. An operator according to claim 5, wherein said housing means includes sleeve means defining said bore and an end wall fixedly secured to one end of said sleeve means for substantially closing same, said inlet passage means extending through said end wall, said housing means further including a removable cap in threaded engagement with said sleeve means adjacent the other end thereof, said cap having an enlarged recess formed in the outer end thereof and extending partially through the axial length of said cap, at least a portion of said recess being threaded, and said cap having a further reduced diameter opening coaxially aligned with and in communication with said recess and extending axially through the remainder of said cap for communicating with said second chamber, the free end of said rod being slideably disposed within said opening for coaction with a selected member disposed within said recess.

9. An operator according to claim 8, further including a shiftable spool valve assembly removably secured to said housing means, said assembly including a portion disposed within said recess in threaded engagement with said cap, and said assembly including a shiftable valve spool having an end portion disposed at least in part within said recess and adapted for abutting engagement with the free end of said rod whereby movement of said piston means between said first and second positions causes a corresponding shifting of said valve spool.

10. An automatically resettable operator, particularly for a valve, comprising:

housing means including substantially cylindrical sidewall means and first and second end wall means fixedly connected to said sidewall means adjacent the opposite ends thereof and defining a substantially closed bore therein;

piston means positioned within said bore in slideable sealing engagement with said housing means for movement between first and second positions, said piston means dividing said bore into first and second chambers, said first chamber being defined between said piston means and said first end wall means;

inlet passage means formed in said housing means adjacent said first end wall means and providing direct communication with said first chamber for supplying pressure fluid to said first chamber for causing movement of said piston means from said first to said second position;

actuator means in engagement with said piston means and movable therewith for causing actuation of a selected member, such as a valve spool, said actuator means including an elongated member disposed within said second chamber and having one end in engagement with said piston means, the other end of said elongated member extending outwardly beyond said second chamber for abutting engagement with said selected member, and said other end being sealingly and slideably supported by said housing means;

spring means disposed within said second chamber in surrounding relationship with said elongated member for urging said piston means toward said first position, one end of said spring means being axially stationarily positioned relative to said housing means; and reset means for causing said piston means to automatically return to said first position in opposition to the pressure fluid in said first chamber a determined time after said piston means has moved to said second position, said reset means including flow passageway means providing continuous communication between said first and second chambers, said flow passageway means including orifice means of small cross-sectional area.

* * * * *